(12) United States Patent
Song (10) Patent No.: US 6,521,365 B1
(45) Date of Patent: Feb. 18, 2003

(54) STACKLESS WASTE MATERIAL RENEWAL PROCESS UTILIZING OXYGEN ENRICHED GAS

(75) Inventor: Seok Mok Song, Seoul (KR)

(73) Assignee: C&G Environmental Technology Co., Ltd., Seoul (KR)

( * ) Notice: Subject to any disclaimer, the term of this patent is extended or adjusted under 35 U.S.C. 154(b) by 83 days.

(21) Appl. No.: 09/643,878

(22) Filed: Aug. 23, 2000

(30) Foreign Application Priority Data

Aug. 23, 1999 (KR) .............................................. 99-34877

(51) Int. Cl.[7] .......................... C01B 31/20; C05C 9/00; H01M 8/04
(52) U.S. Cl. .............................. 429/17; 71/28; 252/373; 423/437.1
(58) Field of Search .......................... 423/648.1, 437.1; 252/373; 429/17; 71/28

(56) References Cited

U.S. PATENT DOCUMENTS

| | | | |
|---|---|---|---|
| 4,949,652 A | 8/1990 | Hadley | |
| 5,123,364 A | 6/1992 | Gitman et al. | |
| 5,170,725 A | 12/1992 | Sass et al. | |
| 5,179,903 A | 1/1993 | Abboud et al. | |
| 5,306,475 A | * 4/1994 | Fichtel et al. | 423/210 |
| 5,402,739 A | 4/1995 | Abboud et al. | |
| 5,435,940 A | * 7/1995 | Doering et al. | 252/373 |
| 5,498,370 A | * 3/1996 | Bhattacharyya et al. | 252/373 |
| 5,607,654 A | * 3/1997 | Lerner | 423/210 |
| 5,724,805 A | 3/1998 | Golomb et al. | |
| 5,900,224 A | * 5/1999 | Fujimura et al. | 423/648.1 |
| 5,980,858 A | * 11/1999 | Fujimura et al. | 423/648.1 |
| 6,090,357 A | * 7/2000 | Hammer | 423/210 |

* cited by examiner

Primary Examiner—Wayne A. Langel (57) ABSTRACT

A waste renewal process in which waste material is burned without causing pollution, while exhaust products are renewed by converting them to useful by-products. The process is implemented in a furnace which has evaporation, thermal decomposition, combustion, and melting zones, and the thermal decomposition exhaust gases are converted to $CO_2$ and synthesis gas, which may be re-utilized to produce a variety of products.

13 Claims, 11 Drawing Sheets

Overall process of the present invention.
(Stackless emission free waste material renewal process)

Fig. 1. Conventional waste material incineration process.

Fig. 2. Overall process of the present invention.
(Stackless emission free waste material renewal process)

Fig. 3. Structure & function of waste material melting - thermal decomposition furnace.

Fig. 3. 1. Structure & function of melting - thermal decomposition furnace body.

Fig 3. 2. Structure & furnace of waste material supply device.

Fig. 3. 3. Structure & function of quench granulation receiver and separation device.

Fig. 4. High grade purification process.

Fig. 5. Waste water reclaiming process.

Fig. 6. Representative product producing process of the present invention.

Fig. 6. 1. $CO_2(g)$, $CO_2(\ell)$ and Dry-Ice producing process.

Fig. 6. Continued

Fig. 6. 2. Synthesis gas of dimethylether(DME) producing process.

Fig. 7. Representative example of integrated system of utilizing waste materials as resources.

Case I. Hydrogen Producing & utilization process.

Fig. 7. Continued

Case II. DME producing process.

Fig. 7. Continued

Case III. Ammonia and urea fertilizer producing process.

STACKLESS WASTE MATERIAL RENEWAL PROCESS UTILIZING OXYGEN ENRICHED GAS

BACKGROUND OF THE INVENTION

1. Field of the Invention

The present invention relates to a waste disposal process in which waste material is completely renewed to useful matters applying oxygen enriched gas(pure oxygen+Steam+$CO_2$ gas) instead of air, thus allowing to accomplish emission free closed system and be able to eliminate conventional stack(source of pollution) and achieved innovative overall process performances.

2. Description of the Related Art

AS is well known, trash or waste material created from a variety of sources have been finally disposed by way of earth filling or incineration.

Such a conventional incineration process of waste material burns by the air under assist of auxiliary fuel burner, then produce flue gas and non-combustible residues.

Then, any hazardous substance contained in the flue gas thusly produced combustion gas is purged and discharged at a level pursuant to rules and regulations imposed by the government. Non-combustible inorganic matter including the combustion residue, particulate matter and waste additive is collected and solidified for earth filling. The combustion heat generated during the combustion process can be collected for a reuse in a boiler.

Figure 1:
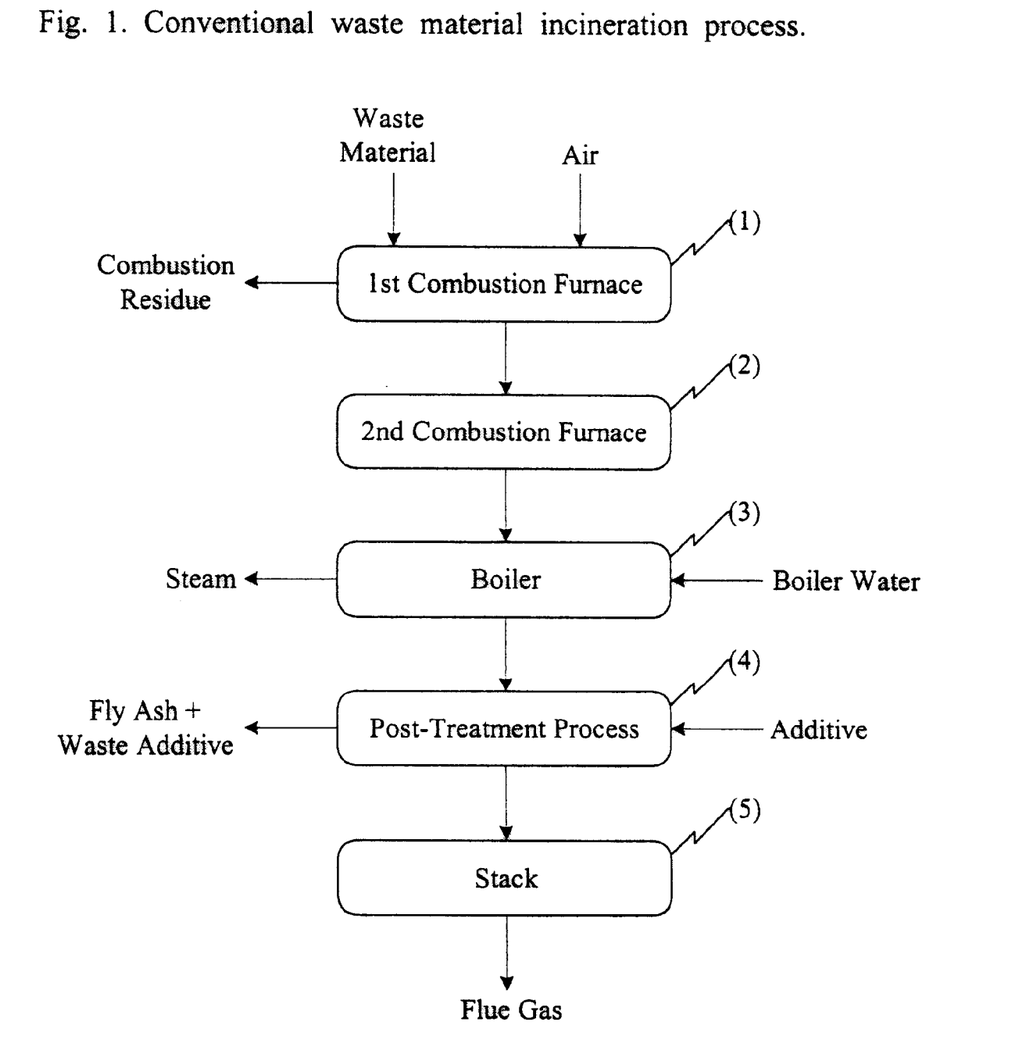
FIG. 1 Conventional waste material incinerating process.

FIG. 1 illustrates a conventional waste incineration system, wherein a first combustion furnace(1) burns a solid waste substance using the air and a second combustion furnace(2) fires the exhaust gases containing combustible gas and particulate matter. And the combustion heat collected as a steam by latent heat of vaporization of water in a boiler(3). A post-treatment process(4) eliminates hazardous gases and dusts to satisfy a level imposed by the rules and regulations imposed by the government, and the flue gas finally exhaust to the atmosphere through a stack(5). The first and second combustion furnace(1) and (2) may exist in a single incinerator or in incinerators separated from each other. However, physical structure of the combustion chambers reflects an excellent mixture of combustion gases therein.

In the post-treatment process(4), SOx, HCl, NOx, and dusts of hazardous material contained in the flue gas are primarily eliminated, together with an extremely small amount of dioxin, mercury, and heavy metals. As a method of elimination, a neutralization-adsorption-filtering method utilizing a hydrated lime and an activated carbon powder is employed. A selective catalytic reaction method under a small amount of ammonia injection is additionally employed for elimination of nitrogen oxide(NOx) and dioxin.

In particular, conditions of combustion time period of at least 2 seconds and combustion temperature of 850° C. or higher are required to be maintained for a complete decomposition of hazardous materials contained in the flue gas, namely, dioxin. For this reason, an auxiliary burner is arranged in the second combustion furnace(2) for support insufficient heat amount of waste material or excessive wetness.

In case of the time band of the steam generating from boiler, do not overlap to the time band of users, the steam commonly used as power source for generation electric power by means of steam turbine-generating systems, and the power utilized as self requirements, while the excess power transmitted to the public network of power. However, since the overall efficiency of power generation is significantly lower than the commercial power plant, thereof this systems are generally neglected due to economical reasons.

Such a conventional waste disposal method suffers drawbacks in that hazardous gases may be exhaust via a chimney, which causes a variety of damages and inconveniences in human life in addition to the following problems.

First, the discharged hazardous substance including dioxin which is not decomposed is scattered and accumulated in the nature since the conventional system employs a low pollution process, not a completely pollution-free process.

Second, the only gain from the waste disposal is use of collected heat in the boiler and the amount of the heat is extremely small. Therefore, a high level technique for eliminating of hazardous material may not be applied.

Third, a large volume of unnecessary nitrogen should be introduced since air is used as an oxygen supply source. Thus, hazardous gas, namely, thermal nitrogen oxide(NOx) is generated, and a large sized apparatus is needed, increasing in operation and construction cost. In addition, thusgenerated hazardous material is diluted by a large volume of nitrogen, resulting in low performance of elimination of hazardous material in post-treatment process, lowering an overall process efficiency.

SUMMARY OF THE INVENTION

Therefore, it is an object of the present invention to provide a stackless and emission free waste disposal process in which an oxygen enriched gas is utilized for a complete renewal of the waste material.

To accomplish the above object of the present invention, there is provided a waste material disposal process in which a conventional process of using a combustion chamber is replaced with a process of using a melting-low temperature thermal decomposition furnace(21) having a unique and simple configuration, and a process of using a low temperature catalyst-combustion process(24) or high temperature catalyst steam reforming process(25). And a high grade purification process(22) for removal of hazardous gases and a process(23) of reclaiming the generated waste water utilizing a special low temperature catalytic oxidation are inserted right after melting-low temperature thermal decomposition furnace(21).

BRIEF DESCRIPTION OF THE DRAWINGS

FIG. 3.1 Structure and function of the main body of the melting-thermal decomposition furnace of the present invention;

FIG. 3.2 Structure and function of the waste material supply device

FIG. 3.3 Structure and function of quench & granulation receiver and separation device FIG. 4 High grade purification process of the present invention.

FIG. 6 Representative product producing process of the present invention.

FIG. 6.1 $CO_2$ gas, liquid $CO_2$, dry-ice producing process.

FIG. 6.2 Synthesis gas, dimethylether(DME) producing process.

DETAILED DESCRIPTION OF THE INVENTION

Figure 2:
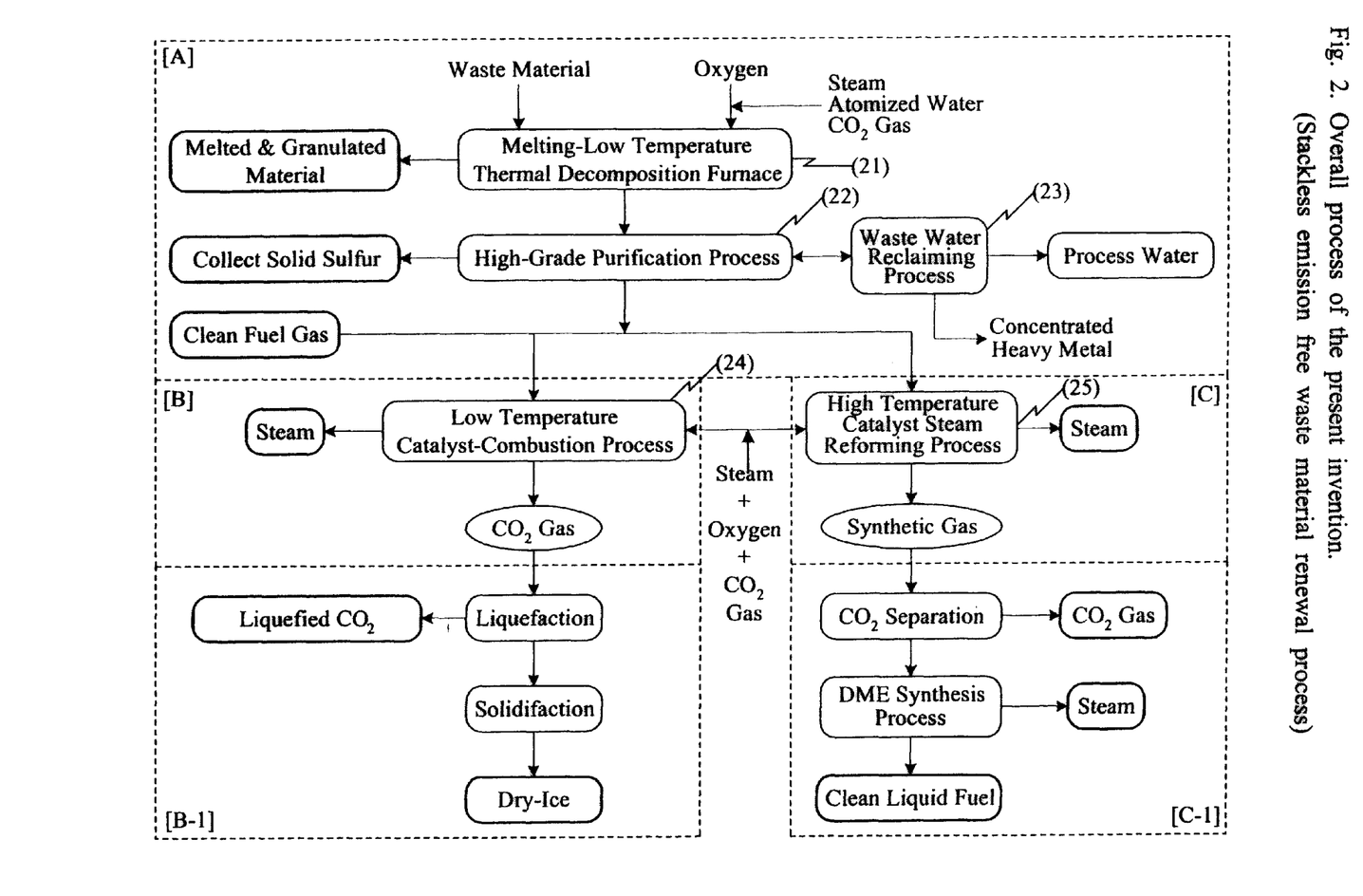
FIG. 2 Overall process of the present invention.

The present invention will be explained in more detail with reference to the attached Figures. FIG. 2 is a block diagram illustrating an overall process of the present invention, in which a oxygen enriched gas mixed of a pure oxygen with $CO_2$ gas, steam or atomized water, instead of air which normaly used at conventional process, is injected to the bottom of the melting-low temperature thermal decomposition furnace (21), for first treating of the waste material which is feeding to top of the same furnace together with some of solid fuel & additives.

The all of non-combustible inoganics contained in the waste material are melted at the bottom of the furnace(21) and granulated so as to obtain a product to be utilized as aggregate or steel members, and the all of combustible organics are partially oxidized & decomposed to combustible gas mixture, so called pyrolized gas, and discharged from top of the furnace(21).

Subsequently, the gas from the furnace(21), are highly purified at the high grade purification process(22) and in which the waste water generated is reclaimed to useful process water at waste water reclaiming process(23), and the highly purified gas are further treated at catalytic-combustion process(24) or catalytic steam reforming process(25) for produce to highly concentrated $CO_2$ gas or synthesis(mixture of $H_2$, CO, $CO_2$) gas.

Those of $CO_2$ & synthesis gases are very useful representative product which are utilized widely in the field of petrochemical industry as substitute of petroleum.

Mean while the highly purified gas form the high grade purification process(22) is, itself or after separation of $CO_2$ gas, used as pure fuel gas and concentrated $CO_2$ gas.

The above-mentioned pure oxygen is obtained by a common air separation method[Cryogenic process or PSA (pressure swing Absorbent) unit], and the nitrogen produced simultaneously also may be utilized as necessary.

In the present invention, the process control & protection systems are fully provided with usual control panel & DCS computer as per optimized control logic & convenience for operation.

Figure 3:
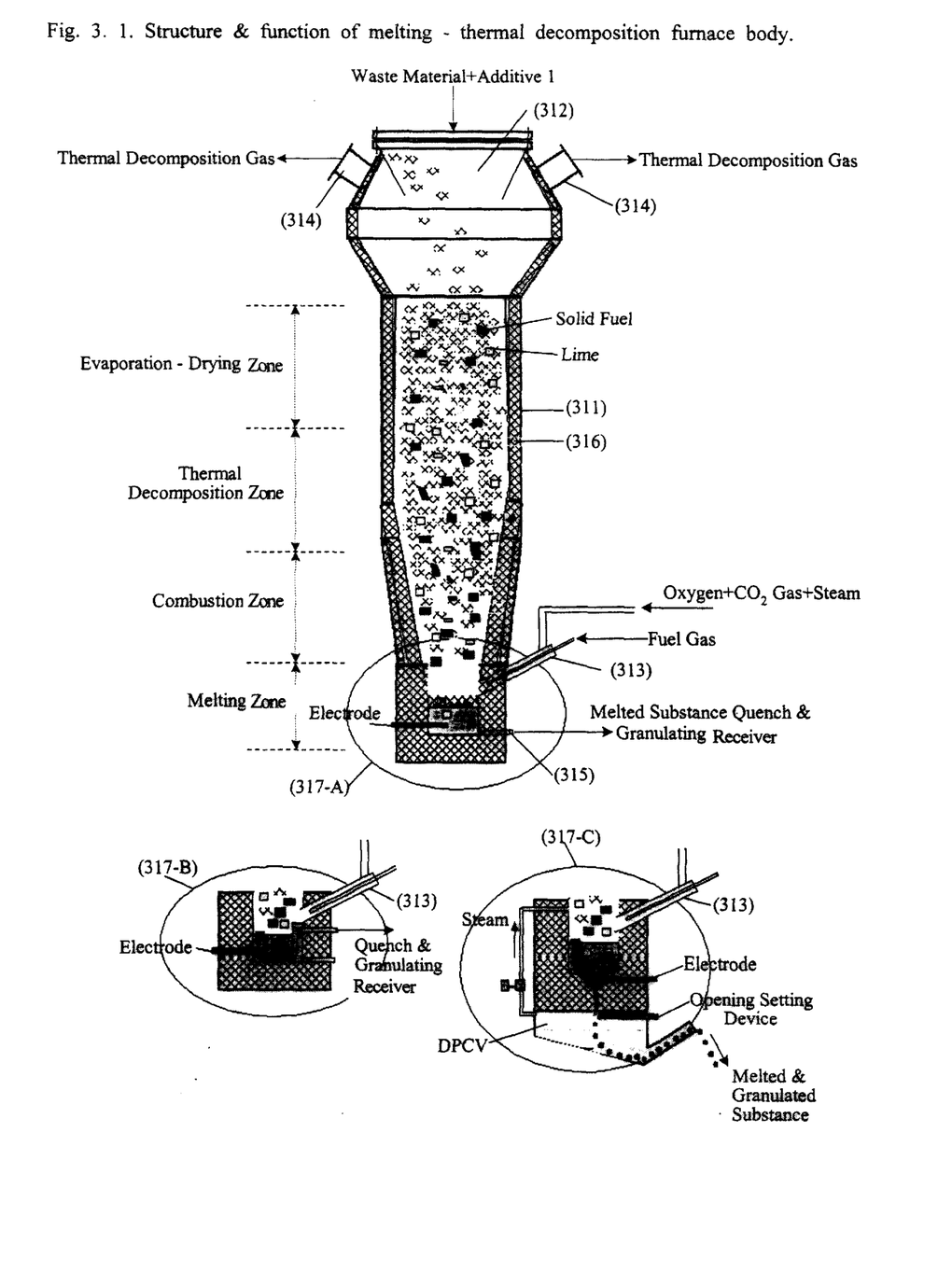
FIG. 3 Structure & function of waste material melting-thermal decomposition furnace of the present invention.

Here under describe in more detail as per process;
Process 1: Function and Structure of Melting-low Temperature Thermal Decomposition Furnace FIGS. 3a–3c illustrate in detail the melting-low temperature thermal decomposition furnace(21) of FIG. 2, wherein FIG. 3a illustrates the main body of the melting-low temperature thermal decomposition furnace and the melting zone of the bottom, FIG. 3b illustrates a device for supplying the waste and additive-1 to the top of the melting-low temperature thermal decomposition furnace, and FIG. 3c illustrates a device for quench-granulation-separation the discharged melted substance.

Figure 32:
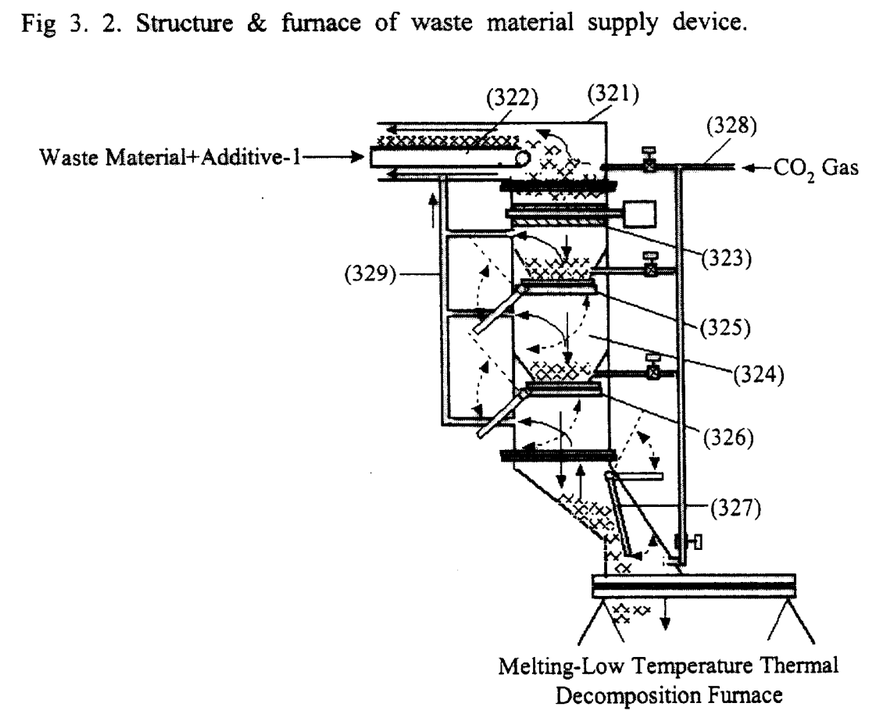

Referring to FIG. 3b, the mixture of waste and additive-1 is continuously fed at an appropriate speed to a first cavity of the upper portion of the waste supply device by a waste transport device(322) installed in a main body of a waste supply device(321). The fed waste is then intermittently passed down to a second cavity at an appropriate time interval by a feed apparatus(323). The waste in the second cavity goes down to a sealing chamber(324), a third cavity, every time a door(325) arranged on the sealing chamber (324) is opened. When the waste is passed down, the door(325) is closed, thus confining the waste in the sealing chamber(324). Here, a $CO_2$ gas supplied thru the supply system(328) to the sealing chamber(324), during a predetermined time period, thus pushing the air in the sealing chamber(324) to the outside via an outlet. Then, a lower door(326) is opened to allow the waste to move down to a fourth cavity, and the door(326) is closed. The waste is fed into the top of the melting-low temperature thermal decomposition furnace (311) through a supply shut-off door(327).

As mentioned above, the waste is confined in the sealing chamber, and the $CO_2$ gas is employed to push out the air coexisting with the waste material. This is to prevent forming of explosive gas which may be otherwise formed by a mixture of oxygen in the air and a thermal decomposition gas produced from the furnace(311). Another purpose of pushing out air is to prevent degradation in quality of final product and lowering the performance of the related processing unit.

The above-mentioned intermittent feeding of the waste is completely automatically and repeatedly performed once the supply interval is set in accordance with the waste disposal capacity and air mixture allowance amount of the furnace 311. The door(327) is for closing the furnace(311) during the non-feeding period, for example, during maintenance and repairing of waste supply device or during a start-up period.

A mixture of carbon dioxide gas and air discharged from each cavity by the pressure of purge $CO_2$ gas, flows back through the supply passage of the waste material, to the adsorption tower filled with activated carbon for adsorb malodorous constituent contained in the gas stream. The activated carbon for use of removal of malodorous constituent is periodically replaced with a new one, and the used activated carbon is injected into the furnace(311) together with the waste material for decompose all of hazardous matters.

A mixture of the waste material and additive-1 thusly introduced into an upper inlet(312) of the furnace(311), sequentially flow down through an evaporation-drying zone of the waste material, a thermal decomposition zone of organic substance, a complete combustion zone of remained organic substance, and finally melting zone where the all of inorganics are melted and discharged, under the conditions of direct contacting to a rising hot stream of combustion gas which formed by a high temperature combustion by means of oxygen enriched gas(mixture of pure oxygen, steam or $CO_2$ gas) introduced to the bottom nozzle(313) of the furnace. During such a process, the entire organic substance converted to partially oxidized & pylorized and is discharged to the subsequent process via an outlet(314), while the entire non-combustible inorganic substance is moved down to the high temperature melting layer, melted and discharged to a granulating reservoir(331) via an outlet (315), and granulated and selected to be utilized as an aggregate member.

The furnace(311) has a physical structure of a simple vertical cylinder an internal diameter of which increases slightly and decreases as it goes from the upper portion toward the lower portion thereof. The total retention time of waste material in the furnace is about 4 to 6 hours which allow to enough contacts and react with each others, thus allowing a stable and safe homogeneous processing.

Figure 33:
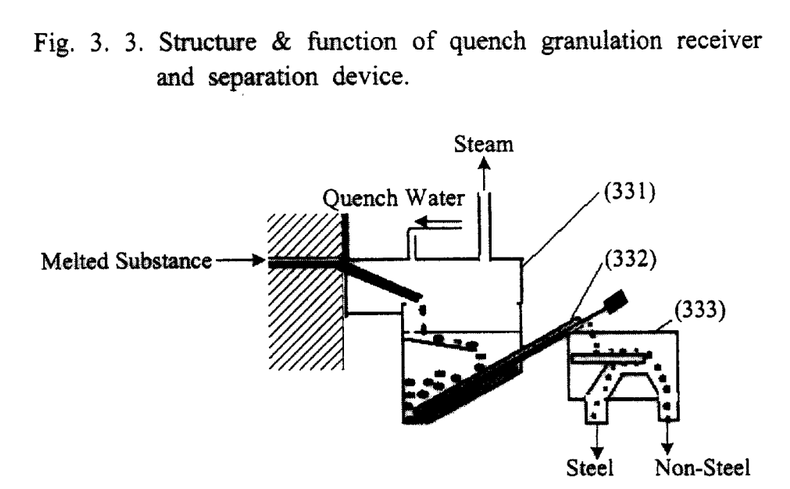

The melted material is always maintained for 1 to 2 hours at the bottom of the furnace and discharged to quench-granulated receiver(331) where the molten materials are crushed within the water filled vessel and transported by conveyer(332) to the separator (333) and the iron contained particulate are separated from the others, so as to produce harmless useful particulate matters.

The additive-1 mixed with the waste material and injected into the furnace(311) is the mixture of a solid fuel having a low combustion speed and which provides a heat required for melting inorganic substance in the bottom of melting zone, the solid substance for lowering the melting point & fluidity of the molten substance and the collected waste solid substance from the high grade purification process in the later stage of the process. The additive-1 is appropriately adjusted in its composition and amount according to the physical characteristic and amount of the inorganic substance contained in the waste material. In addition to the above mentioned functions, the additive-1 also serves to provide gas permeability for the layer of waste material loading zone.

As a solid fuel having a low combustion speed, coke or coal may be employed, and as a material for adjusting physical characteristic of melting substance, lime or waste glass having a low melting point is employed.

The present invention is characterized in that the heat required for melting of the inorganic substance is more effectively and stably supplied, in addition to the above-described solid fuel, by a fuel gas supplied from the oxygen enriched gas injection nozzle(313) and an electric heater installed in the melting zone which is to be discussed later. The electric heater mounted in an interior of the melting zone is the most convenient and effective means for maintaining the melted state of the melting substance. However, such an electric heater is utilized in minimum since an energy cost for operating the electric heater is high. The fuel gas and solid fuel may be utilized as a supplement.

An operative temperature range of the furnace(311) is 1,400° C. to 1,800° C. for the melting zone, 800° C. to 1,500° C. for the combustion zone, 500° C. to 1,100° C. for the partial combustion-thermal decomposition zone, and 200° C. to 600° C. for the evaporation-drying zone. A gauge pressure of the lower portion of the furnace(311) is 60 mmH$_2$O to 600 mmH$_2$O and a gauge pressure of the upper portion of the furnace(311) is +130 mmH$_2$O to −30 mmH$_2$O. A control principle is as follows.

| Object to be controlled | Control parameter |
| --- | --- |
| Total supply amount of pure oxygen | Temperature of the upper portion of the combustion layer at 800° C. to 1,000° C. and 0.1% < oxygen concentration in the pylorized gas < 0.5% |
| Amount of steam and CO$_2$ gas feed | Temperature of melting zone at 1,400° C. to 1,600° C. and pylorized gas composition. |
| Melting zone temperature | Solid fuel (coke) feed amount, fuel gas injection amount, and electric power to electric heater |
| Exhaust gas temperature | Feed amount of waste material & amount of water injection |
| Amount of additive-1 feed | Physical characteristics & melting temperature of melting substance. |
| Discharge of melted material | Continuously or intermittently discharge according to the structure of the melting zone. |

The melting zone positioned at the bottom of the melting-low temperature thermal decomposition furnace(311) has three typical types of discharge method, as shown 317-A, 317-B, and 317-C in the FIG. 3.1. One of those method may be choosed as per purchasers option according to the features thereof, explained the functions as following:

Manual Intermittent Discharge Type (317-A)

This type has a side outlet at the bottom end of the melting zone. The outlet is normally closed by a clay block and the clay is periodically unplugged when an appropriate amount of molten substance is accumulated so as to discharge the molten substance to the quench-granulating receiver. Then, the outlet is plugged again by a clay. This type has a most simple configuration, however, an additional equipment and manpower is required for manual plugging/unplugging of the outlet. Also in case of unplugging work over delayed, the high temperature gas shall be blew out after the molten liquid discharge, and such phenomenon some times will causes to accident. For maintaining more stable melting state of the inorganic substance, an electric heater is arranged in the melting zone for an automatic control of melting state.

Continuous Overflow Discharge Type (317-B)

This type has an overflow apparatus arranged in the melting zone such that the molten substance continuously overflows via an overflow passage when the molten liquid level of the melting zone is higher than balancing level (this level may vary according to an internal pressure). An other outlet similar to that of 317-A type on bottom is provided for the necessity of complete discharge the molten substance whenever required.

Continuous Automative Discharge Type (317-C)

This type adopts a method in that the quench-granulating receiver is closely connected to the outlet of the molten substance and sealed perfectly against to atmosphere, and the molten substance is continuously and automatically discharged while maintaining at a regulated level the liquid of the molten substance in the melting zone by control of the differential pressure between the quench-granulating receiver and the vapor phase of the melting zone. And the differential pressure control is performed by controlling a differential pressure control valve(DPCV) installed in a pipe connected in between the quench-granulating receiver and the vapor phase of the melting zone.

Meanwhile, an opening setting device for the degree of the opening of the outlet is arranged at the lowest end of the melt outlet. In addition, a conventional control device(not shown) for maintaining water level is provided in the quench-granulating receiver.

FIG. 3.3 illustrates structure and function of representative apparatus including the transport device(332) for taking the granulated substance out of water and a magnetic separator(333) for dividing the granulated substance into steel and non-steel. If necessary, nonferrous metals by an eddy current may be utilized.

The oxygen enriched gas to the furnace(311) is controlled to have an oxygen concentration of 25% to 50%, the CO$_2$ gas utilized as a diluting gas is a portion of the CO$_2$ gas produced from the down stream of low temperature catalyst-combustion process(24), and the steam is also a portion of those produced in the heat recovery boiler.

Whether to utilize which of CO$_2$ gas or steam as a diluting gas is not such a significant matter.

However, if the final product is a CO$_2$ gas, utilizing only the CO$_2$ gas is convenient while it is more convenient to utilize steam to increase H$_2$/CO ratio if the final product is a synthetic gas.

The low temperature thermal decomposition gas finally discharged from the upper portion of the furnace(311) having the above-described structure and produce mixed gas which has major component as $H_2$, CO, $CO_2$, $H_2O$. Such a gas has main impurities of HCl, $H_2S$, $N_2$ and $O_2$ of 1% or lower, solid particle(un-burned carbon, ash, lime etc.), and is discharged at a temperature of 200° C. to 400° C. to the subsequent high grade purifying process(22) while containing an extremely small amount of hazardous substance likely as dioxin & heavy metals.

The present invention is advantageous in that a significant amount of the contained solidified particle is filtered during the gas passing through the upper layer of waste material. Thus, the amount of the solidified particle is remarkably reduced as compared with those contained in the combustion gas in a conventional melting furnace.

Process 2: High Grade Purification & Waste Water Reclaiming Process

Figure 4:
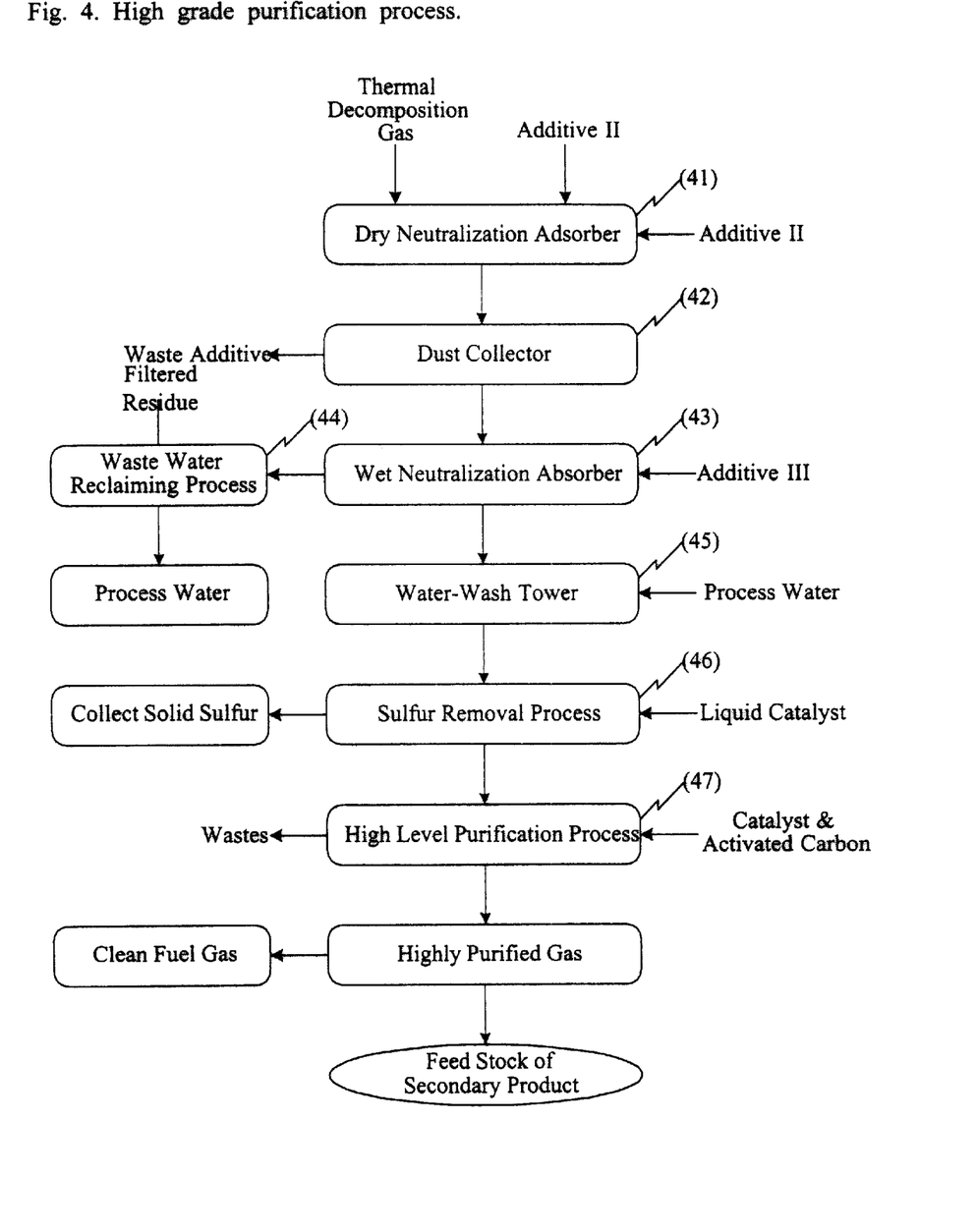

FIG. 4 is a block flow diagram of high grade purification process(22) illustrating a process of removing the hazardous gas contained in the thermal decomposition gas discharged from the melting-low temperature thermal decomposition furnace(21). As shown in FIG. 4, the hazardous gas almost completely removed during passes through a series of processes of dry treatment-wet treatment-high level treatment prior to feed to subsequent process.

The dry treatment process is performed in such a manner that additive-2 composed of hydrated lime[calcium hydrate, $Ca(OH)_2$] and activated carbon powder is mixed to the thermal decomposition gas, hazardous substance is neutralized and adsorbed at the dry neutralization adsorber(41) and collected all of solid particles at the dust collecting filter(42), and the part of solid particles are recycled to the melting-low temperature thermal decomposition furnace(21), the other part is discharge outward, and the gas is fed to next wet neutralization absorber tower. The additive-2 serves to neutralize the acid gas and absorb small amount of poisonous substance including dioxin and heavy metals. An injection amount of the hydrated lime is 1% to 5% of the weight of the waste material, and an injection amount of activated carbon ranges 100 mg to 500 mg per 1 $Nm^3$ of the gas to be treated. It is preferable to have a lower reaction temperature, not exceeding 200° C. at maximum. It is also preferable to have a longer reaction time period and at least 2 seconds or longer. Specifically, it is required that a high quality activated carbon has to be selected. A part of the waste additive collected in the dry treatment process is utilized again in the melting-low temperature thermal decomposition furnace (21) for a composition of additive-1.

The wet treatment process is performed in such a manner of alkali solution scrubbing & pure water washing. An additive-3 composed of mainly caustic soda(up to 10%) is added to the alkali-solution absorbing tower(43) and in which the solution circulated internally thru the full length of the tower for maximize absorbing effect, and the gas water washed at washing tower(45) with process water for eliminating any possible alkali mist. Meanwhile excess water formed due to process water fed & condensate from the gas shall be discharged to waste water reclaiming process(44). In this wet process, most of the remained hazardous substances are neutralized, absorbed and condensed, and the gas introduced to next process after water washing for further purification.

The high level treatment process is performed utilizing the high performance catalyst or special grade of activated carbon, at the process(47) in which an extremely small amount of hazardous substance residual are eliminated by reaction or adsorption and thus produced clean fuel gas consist of $H_2$, CO, $CO_2$ and some of heavy hydrocarbon (mostly $CH_4$) & $O_2+N_2$(less than 5%). And the used waste catalyst or activated carbon are returned to melting-thermal decomposition furnace(21).

In other hand, in case of recover the sulfur due to any reasons, sulfur removal process(46) may be applied right after the wet purification process(45) where the gas washed by the solution which contained liquid catalyst about 0.2%, then the sulfur precipitated to solid powder by the reaction of catalytic reduction, and the solution to be oxidized by air blowing & return to reuse. When apply this process, the loading duty of high level purification process(47) shall be reduced significantly.

As mentioned above, the high grade purification process consist of four sub-process such as dry, wet, high level purification & sulfur removal process, in which one or two sub-process may be omitted or simplified depend on the quality of the waste material & the conditions of final product.

Figure 5:
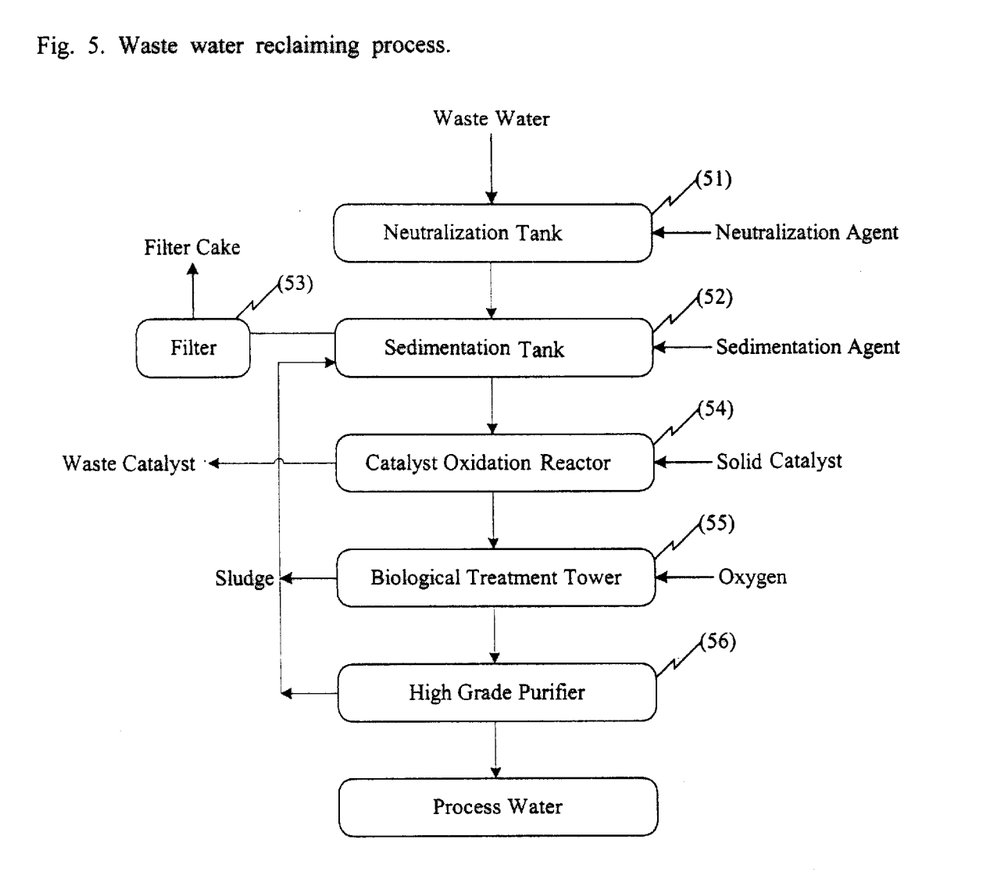
FIG. 5 Waste water reclaiming process of the present invention.

The waste water reclaiming process(44) is reclaiming the waste water produced from wet neutralization absorber(43) to reusable process water, by several sub-process as shown FIG. 5, wherein a neutralization receiver(51), a sedimentation receiver(52), a filter(53), a catalyst oxidation receiver (54), a biological treatment tower(55), and a high performance purifier(56) are arranged. In particular, the waste water is processed by a low temperature oxidation catalyst, and a biological process utilizing a packed tower type high performance treatment technique are applied, thus enhancing an overall treatment efficiency.

The final high performance purifier employs a widely known method including an activated carbon absorbing method, reverse osmotic pressure purifying method, ozone treatment process, ozone+catalyst treatment process, and ion exchange resin method, and the like, according to purpose of users required conditions of water quality. Meanwhile, the filtered residue produced from the waste water treatment process may be returned as much as possible to waste material melting-thermal decomposition furnace(21) under the conditions of avoiding heavy metals accumulation in system & any process interruptions.

Process 3: Low Temperature Catalytic Combustion Process

The highly purified thermal decomposition gas from the high grade purification process(22) at ambient temperature, is a clean fuel gas which has heating value between 1,500~2,000 $kcal/Nm^3$, and usable if any users are available. Otherwise this clean fuel gas shall be treated to more valuable resources by means of low temperature catalytic combustion process(24) or high temperature catalytic steam reforming process(25) where the clean fuel gas converted to highly concentrated clean $CO_2$ gas or clean synthesis gas(mixture of $H_2+CO+CO_2$) which is very valuable substitute of petroleum, as shown FIG. 6.

Figure 61:
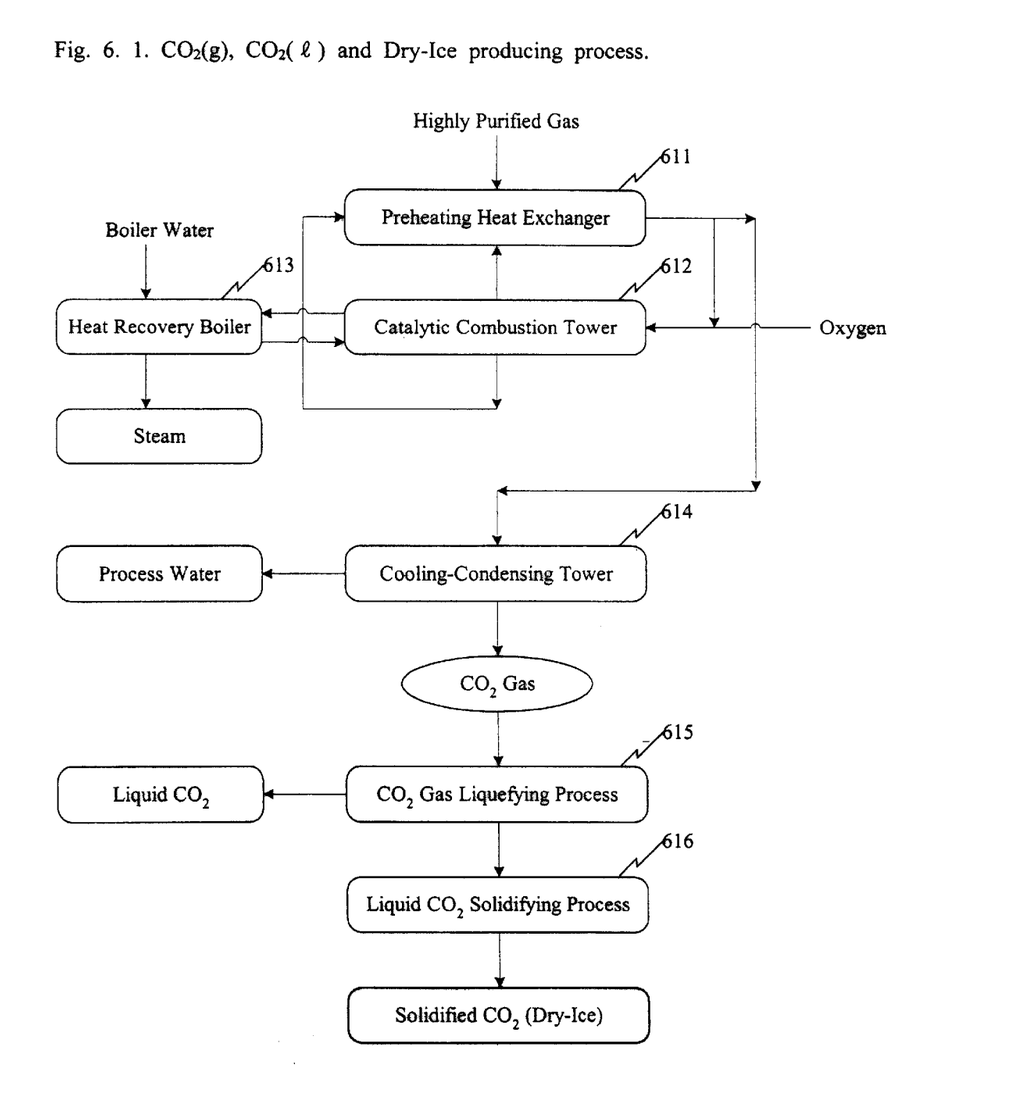

FIG. 6.1 illustrates the low temperature catalytic-combustion process(24), where the highly purified gas is preheated by a preheating heat exchanger(611) to the temperature of 300–400° C. required for catalytic-combustion reaction, and feed to the catalytic combustion tower(612) together with an oxygen enriched gas which required for complete oxidation all of combustible gases.

The catalytic combustion tower(612) adopts a tubular reactor for an effective removal of large quantity of heat produced upon the combustion at 400–500° C. The inside of the tube is filled with catalyst and the outside thereof is circulated with a process water to thereby absorb the combustion heat, thus generating the steam in a boiler(613).

The $CO_2$ gas formed in the catalytic combustion tower (612) transfer its heat of combustion to the boiler(613) and heat exchanger(611), and cool-down to ambient temperature at cooling-condensing tower(614), and separate all of water condensed, thereby produce a highly concentrated $CO_2$ gas. Mean while the water condensate separated may be utilized as necessary after minor treatment.

The highly concentrated $CO_2$ gas is a clean gas containing a some of oxygen($O_2$) of 5% or less, and some of inert gas(N2 & Ar) of 5% or less, and this gas will be utilized as it self or as liquid $CO_2$ or as solid $CO_2$, so called dry-ice, after through the liquefying process(615), and solidifying process(616). The $CO_2$ gas may be utilized as a feed stock for producing urea fertilizer, soda ash, and a variety kind of carbonates.

Figures 6, 62:
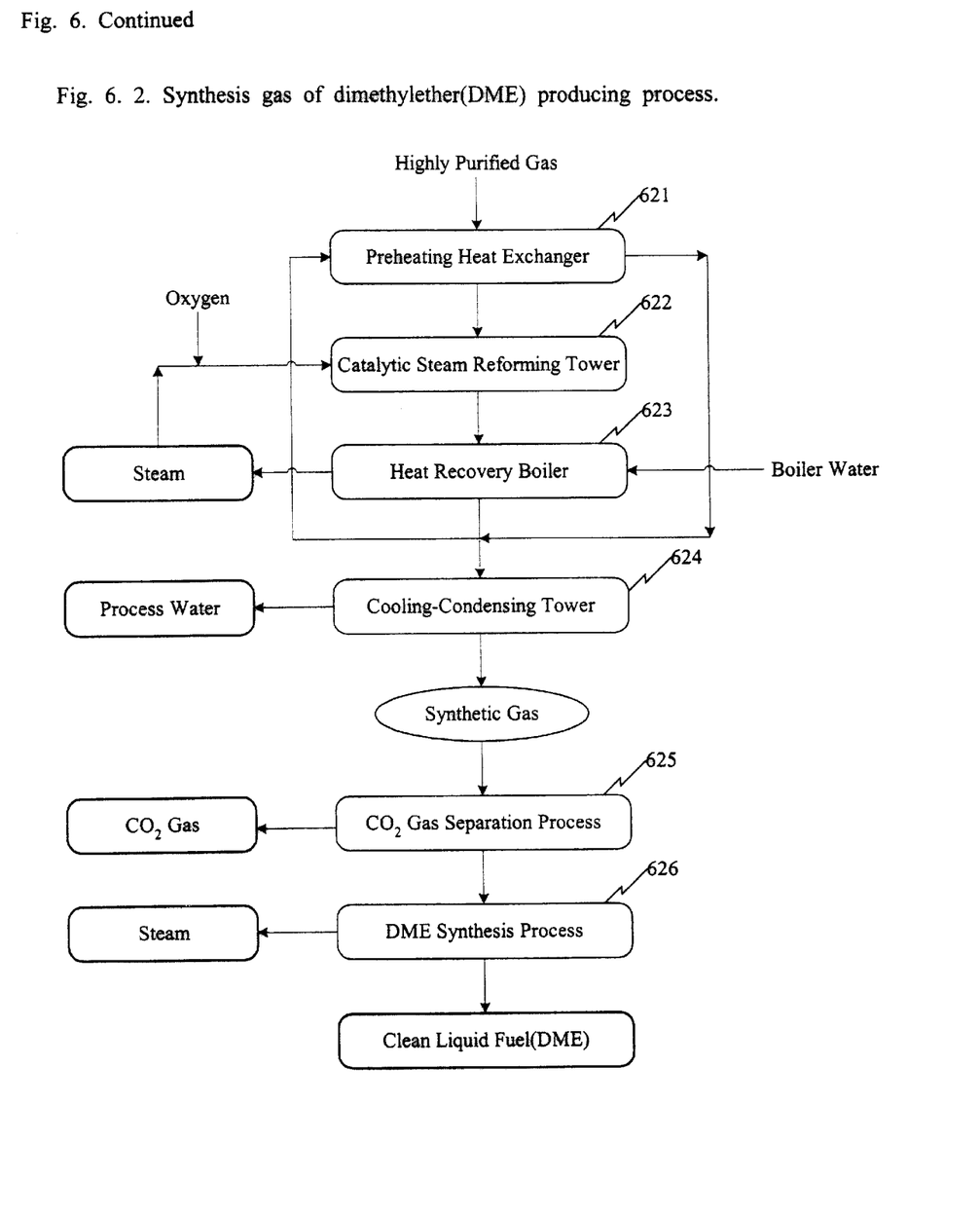

FIG. 6.2 illustrating the high temperature catalytic steam reforming process (25) where the highly purified gas is preheated by a preheating heat exchanger (621) to the temperature of 300–400° C. required for catalytic-reforming reaction, and feed to the catalytic steam reforming tower (622) together with an oxygen enriched gas with steam which required for endothermic(heat absorbtion) reforming reaction at 900–1100° C., thus the clean synthesis gas (mixture of $H_2$+CO+$CO_2$) is produced. The heat required for such a heat absorbing reaction is provided by a portion of combustion heat of gas by oxygen($O_2$) supply.

The high temperature(900–1100° C.) synthetic gas produced in the steam reforming catalytic tower(622), firstly introduced to heat recovery boil(623) for recover sensible heat of the gas, and the residual heat also recovered thru the preheating heat exchanger(621) as much as possible, and finally cool down to ambient temperature at cooling-condensing tower(624), where the all of steam is condensed & separated, hereby produced a clean cooled synthesis gas. Mean while the water condensate separated may be utilized as necessary after minor treatment.

The synthetic gas is a very useful substitute for petroleum and can be produced in a variety of petroleum products. FIG. 6.2 illustrates a case where a clean liquefied fuel, so called dimethylether(DME) is producing. DME is produced by a catalytic reaction under the condition of 50–100 atm pressure and 200–250° C., thru the major sub-process of the CO2 separation process.(625) the DME synthesis process(626) where the main reaction is proceeded as following.

$2CO+4H_2 \rightarrow CH_3COCH_3+H_2O$ −49,000 kcal/kg-mole(exothermic reaction)

$3CO+3H_2 \rightarrow CH_3COCH_3+CO_2$ −58,800 kcal/kg-mole(exothermic reaction)

As described above, the complete combustion or steam reforming process is achieved under extremely enhanced overall performances by means of utilizing the catalyst and which cannot be applicable without high grade purification process prior to catalytic processing. Such organization of process arrangement is major advantageous point of the present invention.

Process 4: Representative Application of Produced Gas by Integrated Process

Figure 7:
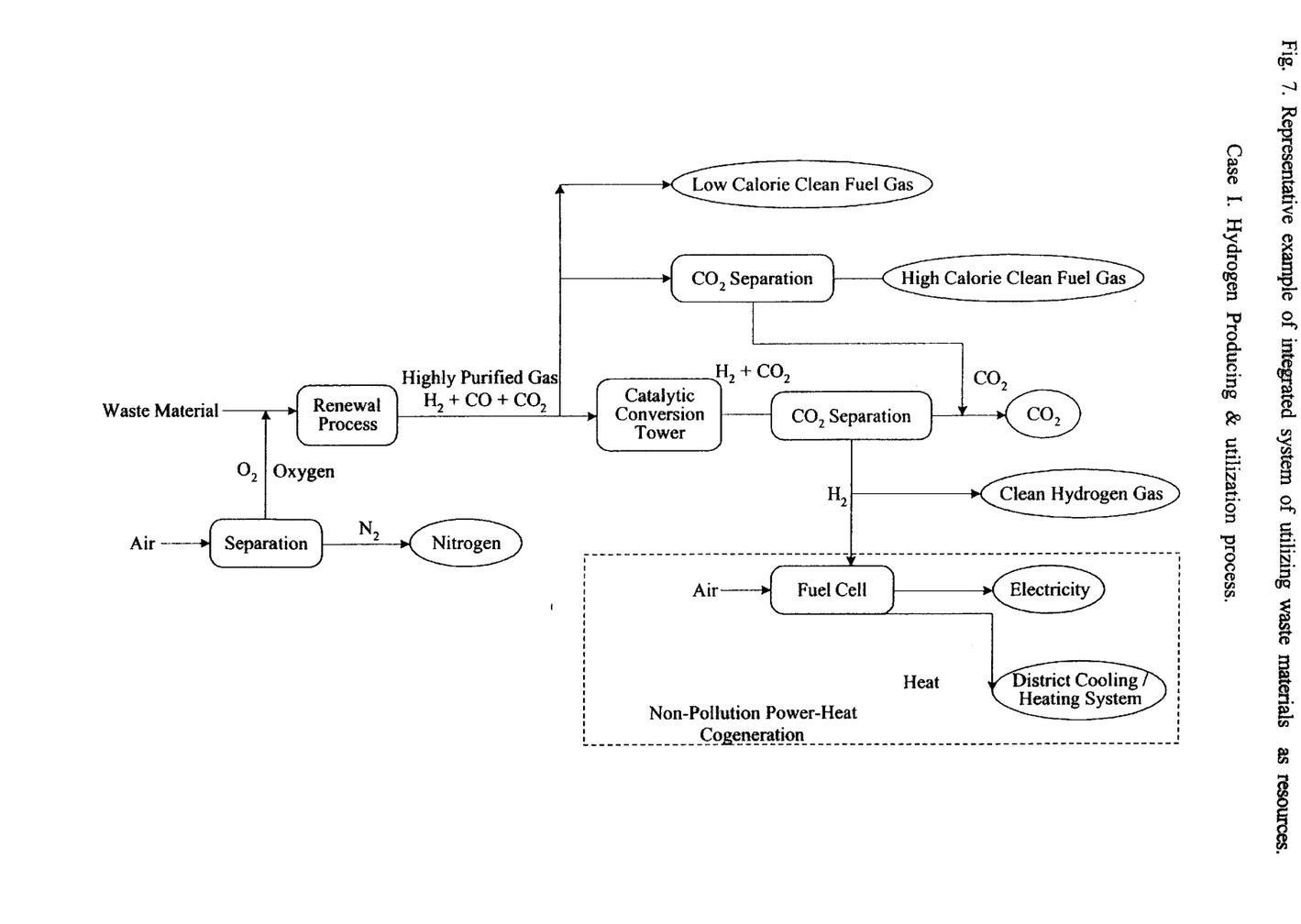
FIG. 7 Representative example of integrated system of utilizing waste material as resources by the present invention.

FIG. 7 illustrates a production flow of the secondary product utilizing $CO_2$ gas or synthetic gas produced according to the present invention, wherein case-I is applicable regardless of the capacity of the process while cases-II and III are applicable to a giant capacity process. In case-I, one of which show most simple utilization of the highly purified gas, as clean fuel gas directly or after separation the $CO_2$ gas to make higher caloric value and utilize $CO_2$ gas too.

An other of which show most valuable utilization of the synthesis gas, where the gas firstly convert all of CO gas to hydrogen by shift conversion reaction and separate all of $CO_2$ gas, thus produce very valuable pure hydrogen. And the clean pure hydrogen can be utilized directly as feed stock in the petrochemical field widely. An other typical & very preferable utilization is application to the distributable power-heat cogeneration by means of hydrogen fuel cell system which is environmentally very comfortable & technically higher efficiency, such as; no emission except steam, non nose, less area requirement, lower construction cost, cheaper operating cost except when the hydrogen made from oil. Mean while the clean pure $CO_2$ cogenerated also be able to utilize as feed stock in the field of liquid $CO_2$, dry-ice, soda ash, urea fertilizer etc.

Case-II shows a process of producing a super low pollution liquid fuel (substitute for existing liquid fuel), so called dimethylether(DME).

The synthesis gas made from present invention, firstly separate $CO_2$ gas from synthesis gas and the remained CO & $H_2$ gas mixture is fed to DME synthesis reactor which is maintained at 50–100 atm. & 200–250° C., where the gas mixture converted partially to the DME under catalytic exthothermic reation, and the produced gas mixture contained DME introduced to separation applatus where the DME separate out as product and the unreacted gas mixture is recycled to the $CO_2$ separation unit for remove $CO_2$ gas which is formed at the reactor, mean while a part of the recycle gas purge out for prevent accumulation of the inert gas, thus all of the synthesis gas converted finally to DME & pure CO2 gas.

The conversion rate of DME at the reactor about 50–80% depend on the conditions of operating pressure, temperature, molal ratio of $H_2$/CO in feed gas, space velocity(gas flow per hour thru catalyst bed/volume of catalyst), activity of catalyst etc..

The molal ratio of $H_2$/CO is very important factor related to overall system performances and the best ratio is known as one($H_2$/CO=1), therefore in this invention, the ratio is able to control precisely, primarily at the melting-thermal decomposition furnace(21) by feed ratio of $CO_2$ gas & steam, and secondary at the steam reforming catalytic reactor(25) by same way of above.

The unreacted gas from the DME reactor may be also utilized as fuel for high efficiency power-heat cogeneration system, so called IGCC(integrated combined cycle for power generation) as shown in dotted line of FIG. 7 case-II, instead of recycling depend on the requirement of user. In this case the capacity of DME synthesis system reduce significantly.

Meanwhile the pure $CO_2$ gas produced through the process may be utilized same as mentioned before.

Case-III shows a giant integrated process for producing ammonia & urea fertilizer by means of processes related to this invention and waste materials as feed stock.

In this integrated process, firstly the $H_2$ gas produced as described at Case-I and the $N_2$ gas produced at air separation unit are mixed to the optimum ratio of 3 ($H_2$/$N_2$=3) and introduce to ammonia synthesis reactor, where the mixed gas converted partially to the ammonia and the unreacted gas shall be recycled, under the condition of 150–200 atm. and 450–500° C. by catalytic exthothermic reaction, and thus the liquid ammonia is produced. The ammonia produced by this way, extremely cheaper than the ammonia produced by conventional way, due to mainly no requirement of oil as feed stock.

Subsequently the urea fertilizer is produced with the ammonia and the $CO_2$ gas which also produced together with the $H_2$, by means of conventional technology. Meanwhile the surplus $N_2$ & $CO_2$ gas may be also utilized as before.

From 1 ton of home waste material, a hydrogen gas of 30–60 kg, a methanol of 160–320 kg, a dimethylether of 115–230 kg, an ammonia of 140–280 kg, and a urea fertilizer of 235–470 kg may be produced respectively. If the waste material is from the industrial field, approximately double amount of final product shall be obtained from 1 tone of the water material.

As described above, the present invention has benefits in that the waste material is completely renewed into a highly concentrated clean $CO_2$ gas or clean fuel gas or synthetic gas for petroleum, harmless solid aggregates, industrial water and heat energy, thus enhancing economical efficiency with a preservation in resources and environment. In other words, the present invention regards the waste material as a raw material for production rather than an object to land filling or incineration.

In addition, by the arrangement of the high grade purification process put it in the right after melting-thermal decomposition furnace, offers excellent process performances to the all of subsequent processes such as corrosion free, applicable catalyst, mild operation conditions, minimize troubles etc.

Further, the present invention offers to eliminates the stack so that results emission free and be able to release from humans complain against the pollution, and also influence to reduce green house effect of the earth by reusing the $CO_2$ gas.

An other advantages of the present invention is to applicable wide range of waste materials as feed stock, not only municipal & industrial waste but also toxic harmful wastes, hospital wastes, land filled wastes, all of bio-mass including animals body, low grade coal etc. And the process principle of this invention(utilize air free oxygen enriched with $O_2$ & recycle $CO_2$) may be applicable to the usual fuel burning furnaces, so that the overall performances of the furnace shall be improved and be able to utilize concentrated $CO_2$ gas, but the economics, in this case, shall be studied carefully.

What is claimed is:

1. A stackless waste material renewal process utilizing an oxygen enriched gas, comprising the steps of:
    providing a thermal decomposition-melting furnace;
    providing oxygen enriched gas to said furnace;
    providing waste material to said furnace at an upper portion;
    burning said waste material in the furnace in such manner that all organic substance contained in the waste material is partially burned-thermally decomposed and discharged to an upper side of the furnace as a thermal decomposition gas while all inorganic substance contained in the waste material is melted and discharged to a lower side of the furnace to be granulated;
    purifying the thermal decomposition gas and reclaiming waste water such that whatever amount of hazardous substance remains in the thermal decomposition gas is neutralized and further processed to produce a purified gas process water;
    producing by-products, by completely burning said purified gas through catalytic combustion to produce carbon dioxide gas and catalytic steam reforming said purified gas to produce a synthetic gas, and
    re-utilizing said carbon dioxide and said synthetic gas to produce secondary products.

2. A process according to claim 1 wherein said furnace includes a main body which includes said upper portion, further comprising:
    using a waste material supply device to provide a waste material and additive mixture to the main body of the furnace at said upper portion;
    providing carbon dioxide gas to said waste material supply device to dispel air coexisting with the waste material;
    mixing said waste material with an additive-1 in said waste material supply device to create said mixture; and
    after said mixture is fed to the main body of said furnace;
        evaporating and drying water contained in said mixture in said furnace,
        thermally decomposing the mixture in said furnace,
        effecting complete combustion of said mixture in said furnace, and
        melting in organics in said mixture in said furnace,
    said evaporation and drying, thermal decomposition, complete combustion, and melting occurring sequentially in progressively lower zones of said furnace, wherein said oxygen enriched gas and a fuel are provided at a lower portion of the furnace, and said mixture is in contact with a rising hot stream produced by combustion of said oxygen enriched gas and fuel.

3. A process according to claim 2, wherein purifying the thermal decomposition gas comprises at least:
    a dry treatment sub-process in which a thermal decomposition gas at a temperature of 200° C. to 600° C. discharged from the furnace is mixed with an additive-2 and a hazardous substance is adsorbed and neutralized in a dry neutralization adsorber and collected by a filter dust collector;
    said purifying of the thermal decomposition gas occurring between the steps of burning said waste material and producing by-products.

4. A process according to claim 3 further comprising:
    a wet treatment sub-process of neutralizing, absorbing, removing, and purifying an amount of hazardous substance remaining after said dry treatment process through a wet neutralization absorbing tower and a pure water wash tower, said hazardous substance being removed by being mixed with an additive-3.

5. A process according to claim 4 further comprising:
    a sub-process in which a trace of hazardous substance existing even after said wet treatment process is adsorbed and made more pure by a catalyst or an activated carbon.

6. A process according to claim 3, wherein said additive-1 is a mixture of carbonate, silicate, solid fuel, a portion of solid substance collected from said dust collector, filtering residue of said reclaiming waste water, and a waste activated carbon.

7. A process according to claim 3, wherein said additive-2 is a mixture of hydrated lime, magnesium hydroxide, and activated carbon powder.

8. A process according to claim 3, wherein said additives-3 is a mixture of alkali solution of sodium hydroxide, sodium bicarbonate, calcium hydroxide, and potassium bicarbonate.

9. A process according to claim 1, wherein reclaiming waste water comprises a low temperature catalytic oxidation, biological treatment, and final purifying treatment.

10. A process according to claim 1, wherein said producing by-products results in a concentrated carbon dioxide gas, and synthetic gas mixture gas of $CO+CO_2+H_2$ which serves as a substitute for petroleum.

11. A process according to claim 1, wherein said re-utilizing is performed by using said purified gas or a product derived therefrom in which carbon dioxide gas is removed, or said re-utilizing is performed by a power-heat cogeneration in which CO is converted to hydrogen, carbon dioxide gas is separated, and $H_2$ is utilized as a fuel of a fuel cell.

12. A process according to claim 1 wherein said re-utilizing comprises producing a low pollution fuel dimethylether from a synthetic gas, a substance remaining after such production being used as a fuel of integrated combined cycle for power generation (IGCC).

13. A process according to claim 1, wherein said re-utilizing is performed in which ammonia is created as a by-product and a urea fertilizer is produced by a portion of said carbon dioxide and said ammonia.

* * * * *